US012633265B2

(12) United States Patent
Sato

(10) Patent No.: US 12,633,265 B2
(45) Date of Patent: May 19, 2026

(54) OPTICAL APPARATUS CAPABLE OF ADJUSTING A LIGHT AMOUNT IN EACH OF A PLURALITY OF OPTICAL SYSTEMS WITH A SIMPLE STRUCTURE

(71) Applicant: CANON KABUSHIKI KAISHA, Tokyo (JP)

(72) Inventor: Katsuhiko Sato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 18/766,934

(22) Filed: Jul. 9, 2024

(65) Prior Publication Data

US 2024/0363081 A1 Oct. 31, 2024

Related U.S. Application Data

(63) Continuation of application No. 18/064,392, filed on Dec. 12, 2022, now Pat. No. 12,067,949.

(30) Foreign Application Priority Data

Dec. 20, 2021 (JP) ................................ 2021-205722
Dec. 20, 2021 (JP) ................................ 2021-205741

(51) Int. Cl.
G09G 3/34 (2006.01)
H04N 23/71 (2023.01)
H04N 23/75 (2023.01)

(52) U.S. Cl.
CPC ............. *G09G 3/342* (2013.01); *H04N 23/71* (2023.01); *H04N 23/75* (2023.01)

(58) Field of Classification Search
CPC ........ H04N 23/71; H04N 23/45; H04N 23/75; G09G 3/342; G09G 3/34
See application file for complete search history.

(56) References Cited

U.S. PATENT DOCUMENTS 7,697,830 B2 * 4/2010 Ide ........................... G02B 7/36
348/349
8,036,521 B2 * 10/2011 Ono ..................... H04N 23/672
396/104

(Continued)

FOREIGN PATENT DOCUMENTS

JP H11146425 A 5/1999
JP H11253400 A 9/1999
(Continued)

OTHER PUBLICATIONS

Office Action issued in U.S. Appl. No. 18/064,392, mailed Oct. 5, 2023.

(Continued)

*Primary Examiner* — Olga V Merkoulova
(74) *Attorney, Agent, or Firm* — ROSSI, KIMMS & McDOWELL LLP

(57) ABSTRACT

An optical apparatus capable of adjusting a light amount in each of a plurality of optical systems with a simple structure is disclosed. The optical apparatus includes a plurality of optical systems, each of which includes a stop, and a controller. The controller adjusts an aperture diameter of the stop in at least one of the plurality of optical systems so as to reduce a difference of brightness among the plurality of optical systems relative to a state in which the aperture diameter of the stop is set to a full-aperture diameter in the respective optical systems.

9 Claims, 6 Drawing Sheets

(56)     References Cited

U.S. PATENT DOCUMENTS

| | | | | |
|---|---|---|---|---|
| 8,432,480 | B2* | 4/2013 | Abe | H04N 23/75 |
| | | | | 348/231.1 |
| 8,730,378 | B2* | 5/2014 | Taguchi | G02B 7/285 |
| | | | | 348/346 |
| 12,067,949 | B2* | 8/2024 | Sato | H04N 23/71 |
| 2010/0150538 | A1* | 6/2010 | Ono | H04N 25/704 |
| | | | | 396/104 |
| 2012/0212635 | A1* | 8/2012 | Abe | H04N 5/77 |
| | | | | 348/E5.04 |
| 2012/0262623 | A1* | 10/2012 | Taguchi | H04N 23/634 |
| | | | | 348/E5.045 |
| 2012/0300051 | A1* | 11/2012 | Daigo | H04N 23/631 |
| | | | | 348/E5.022 |
| 2018/0035034 | A1* | 2/2018 | Nakata | H04N 23/71 |
| 2021/0152717 | A1* | 5/2021 | Tsuzaki | H04N 23/55 |

FOREIGN PATENT DOCUMENTS

| | | | | | |
|---|---|---|---|---|---|
| JP | 2015060048 | A | * | 3/2015 | G03B 19/07 |
| JP | 2017032750 | A | | 2/2017 | |

OTHER PUBLICATIONS

Office Action issued in U.S. Appl. No. 18/064,392, mailed Feb. 21, 2024.

Notice of Allowance issued in U.S. Appl. No. 18/064,392, mailed May 1, 2024.

* cited by examiner

FIG. 2A
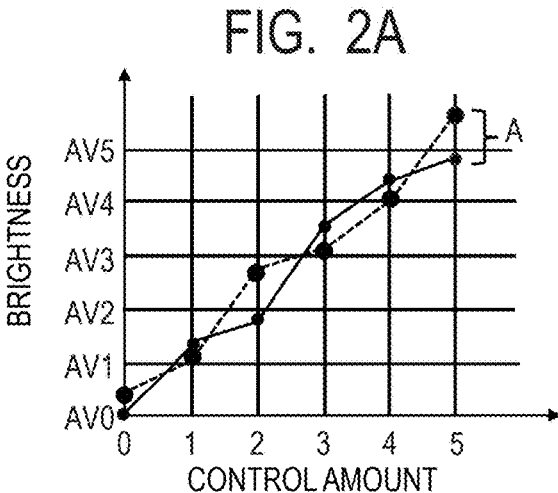
FIG. 2B
FIG. 2C
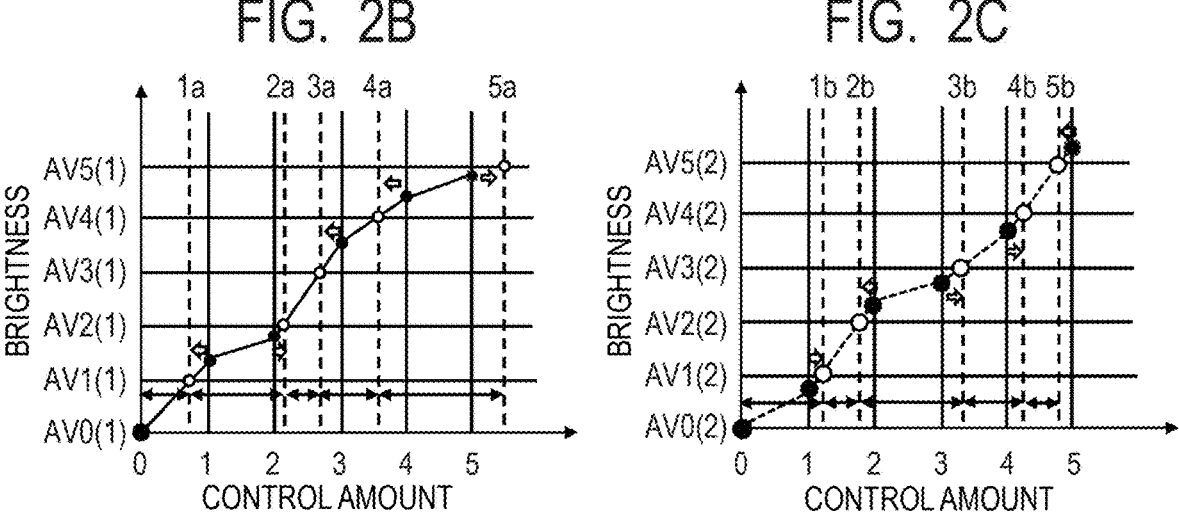
FIG. 3
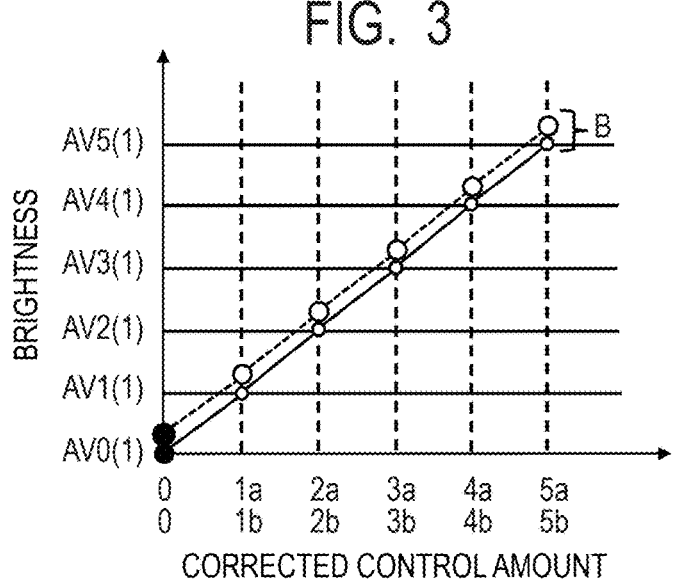

FIG. 4A
FIG. 4B
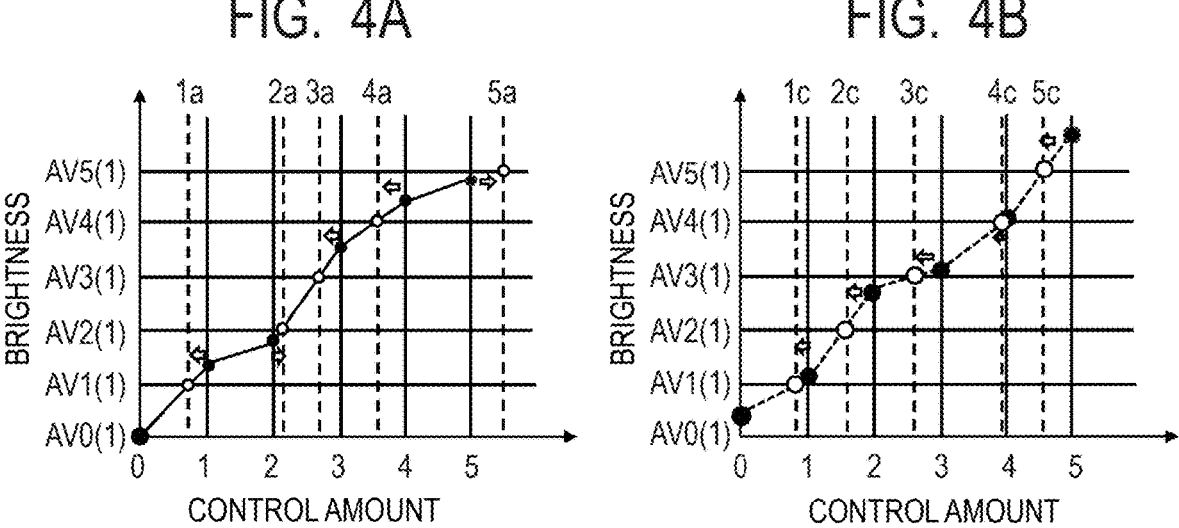
FIG. 4C
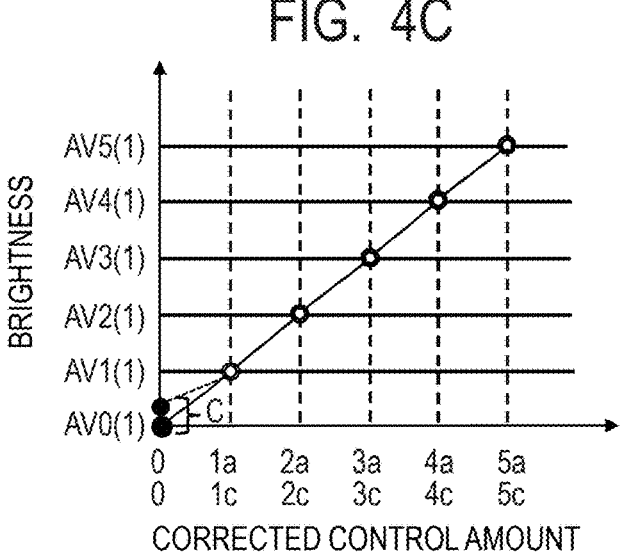

FIG. 10A
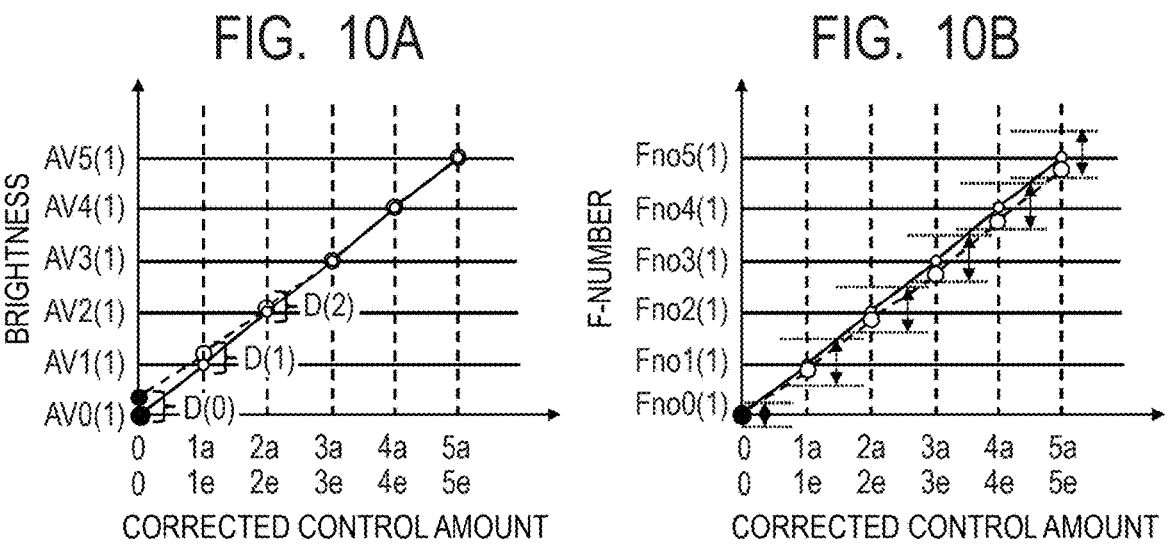
CORRECTED CONTROL AMOUNT
FIG. 10B
CORRECTED CONTROL AMOUNT
FIG. 11A
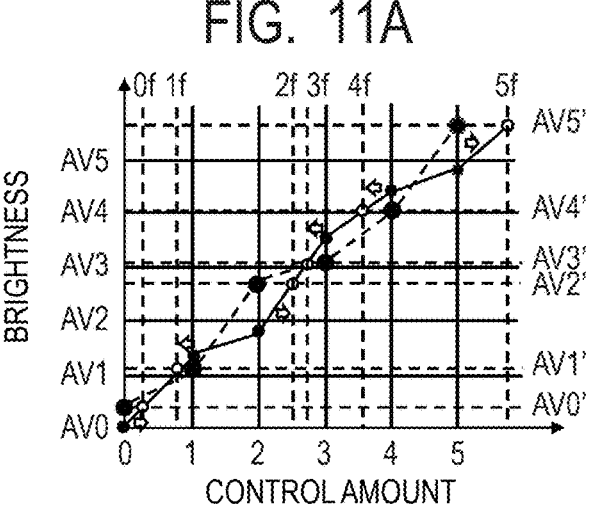
CONTROL AMOUNT
FIG. 11B
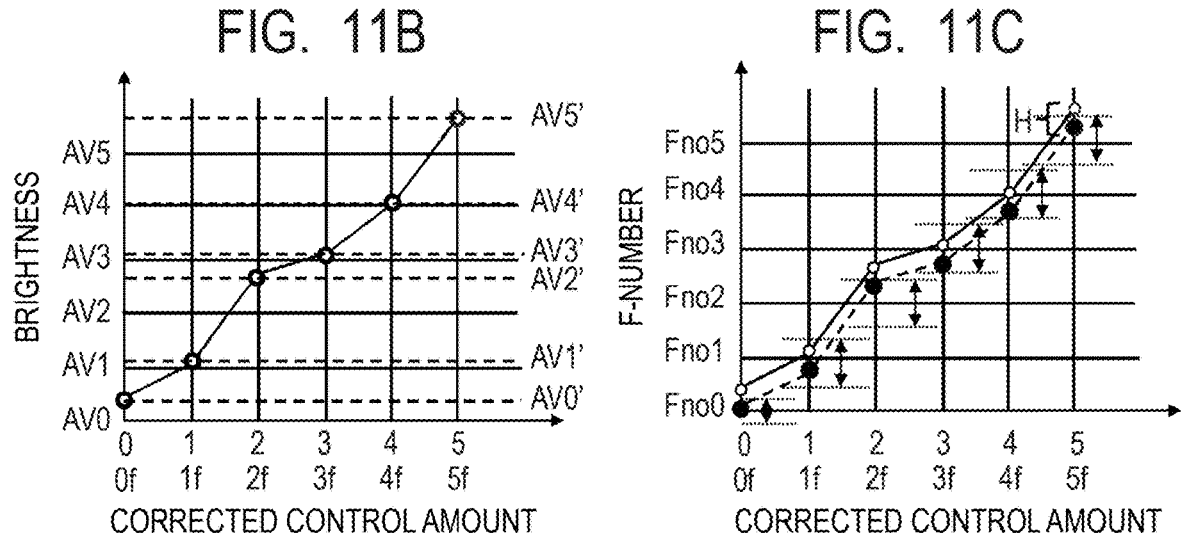
CORRECTED CONTROL AMOUNT
FIG. 11C
CORRECTED CONTROL AMOUNT

OPTICAL APPARATUS CAPABLE OF ADJUSTING A LIGHT AMOUNT IN EACH OF A PLURALITY OF OPTICAL SYSTEMS WITH A SIMPLE STRUCTURE

BACKGROUND OF THE INVENTION

Field of the Invention

The present invention is related to an optical apparatus, and particularly to a multiocular optical system.

Description of the Related Art

Conventionally, there is a concern that an uncomfortable feeling may occur when a plurality of videos or images are viewed at the same time if there is a difference in brightness or the like among the plurality of videos or images in an image pickup apparatus which obtains the plurality of videos or images via a multiocular optical system consisting of a plurality of optical systems.

Japanese Patent Application Laid-Open No. H11-146425 discloses a multiocular camera in which an aperture diameter of a stop is adjusted based on control information received from an external controlling device such that light amounts in a plurality of optical systems coincide with each other.

In the multiocular camera disclosed in Japanese Patent Application Laid-Open No. H11-146425, it is necessary to obtain the control information for the adjustment from the external controlling device every time it is determined that the adjustment of the aperture diameters of respective stops is necessary at the time of use, and particularly processing becomes complicated at the time of obtaining a video.

SUMMARY OF THE INVENTION

An object of the present invention is to provide an optical apparatus capable of adjusting a light amount in each of a plurality of optical systems with a simple structure.

The optical apparatus according to the present invention includes a plurality of optical systems each of which includes a stop, a storing unit configured to store information indicating a relationship between target aperture diameters of the stop and target light amounts in the respective optical systems, and a controller configured to adjust a light amount by changing an aperture diameter of the stop in the respective optical systems based on the information.

Further features of the present invention will become apparent from the following description of exemplary embodiments with reference to the attached drawings.

BRIEF DESCRIPTION OF THE DRAWINGS

FIG. 2A is a graph showing a relationship between control amounts and brightnesses in the multiocular optical system unit according to the first embodiment.

FIG. 2B is a graph showing a state in which the control amount is corrected in the multiocular optical system unit according to the first embodiment.

FIG. 2C is a graph showing a state in which the control amount is corrected in the multiocular optical system unit according to the first embodiment.

FIG. 3 is a graph showing a relationship between corrected control amounts and the brightnesses in the multiocular optical system unit according to the first embodiment.

FIG. 4A is a graph showing a state in which the control amount is corrected in a multiocular optical system unit according to a second embodiment of the present invention.

FIG. 4B is a graph showing a state in which the control amount is corrected in the multiocular optical system unit according to the second embodiment.

FIG. 4C is a graph showing a relationship between the corrected control amounts and the brightnesses in the multiocular optical system unit according to the second embodiment.

FIG. 10A is a graph showing a relationship between the corrected control amounts and the brightnesses in the multiocular optical system unit according to the fifth embodiment.

FIG. 10B is a graph showing a relationship between the corrected control amounts and the F-numbers in the multiocular optical system unit according to the fifth embodiment.

FIG. 11A is a graph showing a state in which the control amount is corrected in a conventional multiocular optical system unit.

FIG. 11B is a graph showing a relationship between the corrected control amounts and the brightnesses in the conventional multiocular optical system unit.

FIG. 11C is a graph showing a relationship between the corrected control amounts and the F-numbers in the conventional multiocular optical system unit.

DESCRIPTION OF THE EMBODIMENTS

Hereinafter, an optical apparatus according to the present invention is described in detail with reference to the accompanying drawings. The drawings described below may be drawn on a scale different from the actual scale in order to facilitate understanding of the present invention.

First Embodiment

An image pickuping is performed by using a multiocular optical system (a composite optical system) consisting of a plurality of optical systems in a stereoscopic image pickup apparatus or a virtual reality (VR) video pickup apparatus.

When there are a manufacturing error and a control variation in light amount adjusting devices provided in the plurality of optical systems, a transmittance variation in respective optical systems and the like, a difference in brightness occurs among a plurality of videos or images obtained via the plurality of optical systems in the multiocular optical system.

There is a concern that an uncomfortable feeling may occur when there is a difference among a plurality of videos or images since the plurality of videos or images obtained via a plurality of optical systems are viewed at the same time in image or video pickup apparatuses as described above.

In particular, since it is easy to recognize a difference in brightness among the obtained videos or images, it is required to perform an adjustment so as to reduce the difference in brightness when there is the difference in brightness.

Conventionally, there is known an image processing method for performing such adjustment by setting a clipping area at a position of a reference area in each of a plurality of images and setting a detection area for adjusting images obtained from the clipping areas in the reference area of any one of the plurality of images.

However, processing becomes complicated when a video is processed in addition to requiring an image processing apparatus for processing the obtained images in such image processing method.

Further, conventionally, a multiocular camera system is known in which a control is performed based on control information received from an external controlling device such that opposed controlled targets in a multiocular camera, namely control amounts in respective optical systems coincide with each other.

However, it is necessary to obtain the control information for the adjustment from the external controlling device every time it is determined that the adjustment of respective optical systems is necessary, and particularly processing becomes complicated at the time of obtaining a video in such multiocular camera system.

Accordingly, an object of the present invention is to provide a multiocular optical system unit capable of performing a control with a high light amount accuracy by reducing a light amount difference among respective optical systems without performing a signal processing, an image processing or the like during use.

Figure 1:
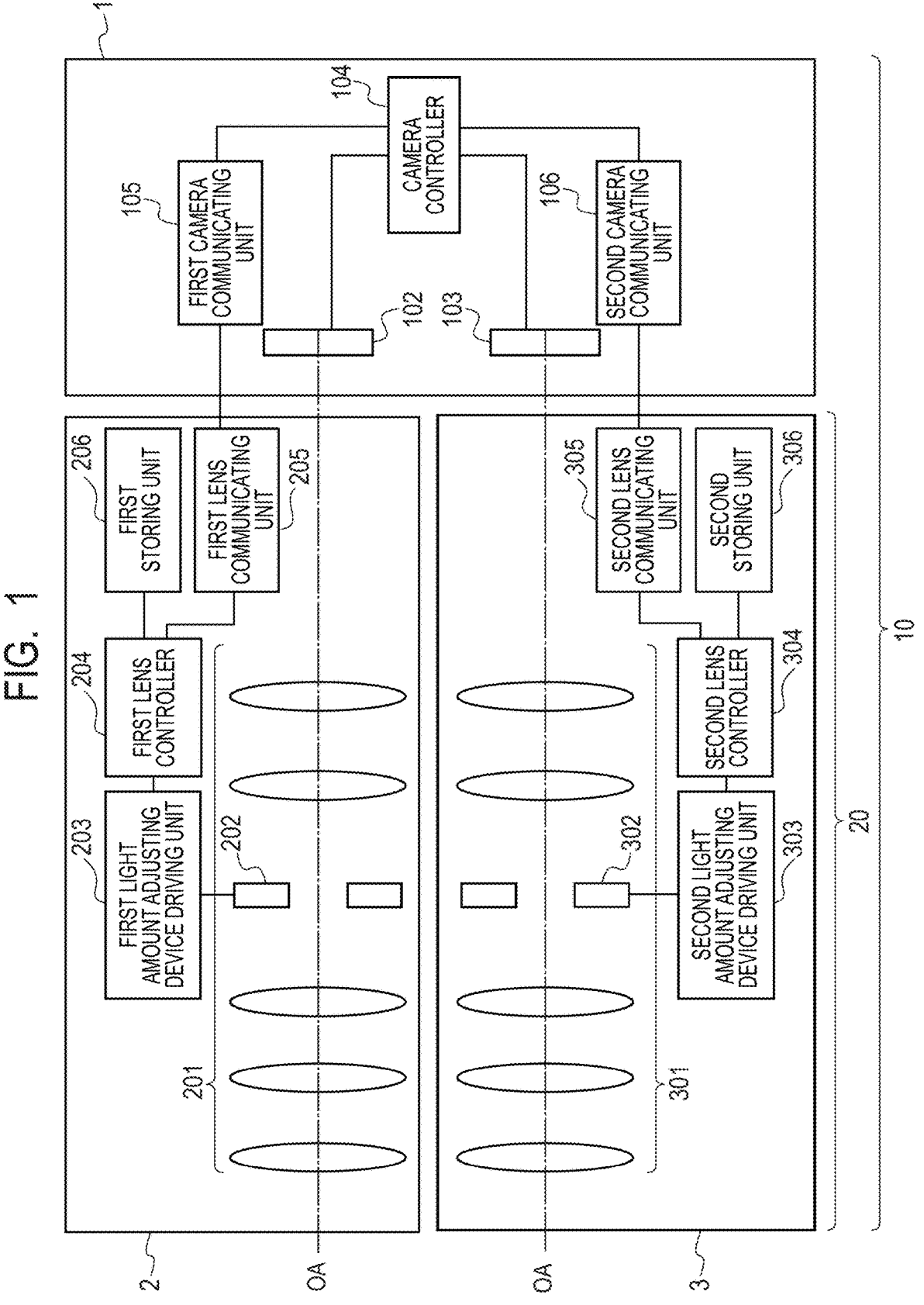
FIG. 1 is a schematic cross-sectional view of an image pickup apparatus including a multiocular optical system unit according to a first embodiment of the present invention.

FIG. 1 shows a schematic cross-sectional view of an image pickup apparatus 10 including a multiocular optical system unit 20 as an optical apparatus according to a first embodiment of the present invention.

The image pickup apparatus 10 includes a camera body 1 and a multiocular optical system unit 20 according to the present embodiment.

Further, the multiocular optical system unit 20 according to the present embodiment includes a first optical system 2 and a second optical system 3.

The multiocular optical system unit 20 according to the present embodiment may be fixed to the camera body 1 or may be attachable to and detachable from the camera body 1 as an interchangeable lens.

Although the multiocular optical system unit 20 according to the present embodiment consists of two optical systems, it may consist of three or more optical systems.

As shown in FIG. 1, the first optical system 2 and the second optical system 3 include a first image pickup optical system 201 and a second image pickup optical system 301 having the same lens structure with a predetermined focal length, respectively.

Further, the first image pickup optical system 201 and the second image pickup optical system 301 are provided with a first light amount adjusting device 202 and a second light amount adjusting device 302, respectively.

Each of the first image pickup optical system 201 and the second image pickup optical system 301 may consist of a plurality of lenses each of which moves independently when the focal length and the focus position thereof are adjusted.

Each of the first image pickup optical system 201 and the second image pickup optical system 301 may consist of a plurality of lens units each of which moves independently as a unit when the focal length and the focus position thereof are adjusted.

Each of the first image pickup optical system 201 and the second image pickup optical system 301 may consist of a combination of at least one lens and at least one lens unit each of which moves independently when the focal length and the focus position thereof are adjusted.

Each of the first light amount adjusting device 202 and the second light amount adjusting device 302 is a stop including a plurality of stop blades (not illustrated) and an opening/closing mechanism (not illustrated) which opens and closes the plurality of stop blades, for example.

Specifically, each of the first light amount adjusting device 202 and the second light amount adjusting device 302 is a so-called iris stop in which the plurality of stop blades arranged around the optical axis OA partially overlap each other to form a stop aperture on the optical axis OA.

Further, the first optical system 2 includes a first light amount adjusting device driving unit 203 as a driving unit for driving the opening/closing mechanism provided in the first light amount adjusting device 202.

Similarly, the second optical system 3 includes a second light amount adjusting device driving unit 303 as a driving unit for driving the opening/closing mechanism provided in the second light amount adjusting device 302.

Hereinafter, the first light amount adjusting device driving unit 203 and the second light amount adjusting device driving unit 303 are simply referred to as a first driving unit 203 (a controller) and a second driving unit 303 (a controller), respectively.

A stop value (an F-number) by each of the first light amount adjusting device 202 and the second light amount adjusting device 302 changes according to positions of the plurality of stop blades.

In the first light amount adjusting device 202 and the second light amount adjusting device 302, an overlap amount among the plurality of stop blades changes according to respective positions of the plurality of stop blades.

Accordingly, an operation load applied to the first driving unit 203 and the second driving unit 303 also changes according to the positions of the plurality of stop blades in the first light amount adjusting device 202 and the second light amount adjusting device 302.

Generally, when the stop value in each of the first light amount adjusting device 202 and the second light amount adjusting device 302, namely the overlap amount among the plurality of stop blades increases, the operation load applied to the first driving unit 203 and the second driving unit 303 increases.

Specifically, each of the first driving unit 203 and the second driving unit 303 includes a stepping motor, for example.

The first optical system 2 includes a first lens controller 204 (a controller) for controlling a driving by the first driving unit 203.

Further, the second optical system 3 includes a second lens controller 304 (a controller) for controlling a driving by the second driving unit 303.

Specifically, the first lens controller 204 and the second lens controller 304 control a driving direction of the first driving unit 203 and the second driving unit 303 by changing a polarity of a driving signal applied to the first driving unit 203 and the second driving unit 303, respectively.

Further, the first lens controller 204 and the second lens controller 304 control a driving position of the first driving unit 203 and the second driving unit 303 by changing the number of pulses of the driving signal applied to the first driving unit 203 and the second driving unit 303, respectively.

This makes it possible to change the opening/closing operation amounts (an aperture amount, an aperture diameter) of the plurality of stop blades in each of the first light amount adjusting device 202 and the second light amount adjusting device 302.

Each of the first driving unit 203 and the second driving unit 303 is provided with a stop position detecting unit (not illustrated) for detecting positions of the plurality of stop blades corresponding to a full-aperture stop position (a full-aperture F-number).

The stop position detecting unit is provided in consideration of a case in which an impact or the like is received, but an open control by a pulse count of a stepping motor may be performed on the stop position detecting unit in the multiocular optical system unit 20 according to the present embodiment.

Further, the first optical system 2 includes a first lens communicating unit 205 for communicating with a first camera communicating unit 105 provided in the camera body 1.

Similarly, the second optical system 3 includes a second lens communicating unit 305 for communicating with a second camera communicating unit 106 provided in the camera body 1.

The first lens controller 204 and the second lens controller 304 receive a signal (a target stop value signal) from the camera body 1 via the first lens communicating unit 205 and the second lens communicating unit 305, respectively.

Then, the first lens controller 204 and the second lens controller 304 control an aperture amount (an aperture diameter) of the first light amount adjusting device 202 and the second light amount adjusting device 302 based on the received signal, respectively.

Specifically, the first lens controller 204 and the second lens controller 304 control the first driving unit 203 and the second driving unit 303 based on a drive instruction control amount (hereinafter, simply referred to as a control amount) corresponding to a brightness (a stop value), respectively.

Thereby, the aperture diameters of the first light amount adjusting device 202 and the second light amount adjusting device 302 are changed.

The first optical system 2 includes a first storing unit 206 for storing a table (information) indicating a relationship between target brightnesses in the first optical system 2 and target control amounts for the first light amount adjusting device 202.

Similarly, the second optical system 3 includes a second storing unit 306 for storing a table (information) indicating a relationship between target brightnesses in the second optical system 3 and target control amounts for the second light amount adjusting device 302.

The first lens controller 204 obtains the target control amount from the table stored in the first storing unit 206 when controlling the first driving unit 203.

Further, the second lens controller 304 obtains the target control amount from the table stored in the second storing unit 306 when controlling the second driving unit 303.

The first storing unit 206 and the second storing unit 306 for storing the table are provided in the first optical system 2 and the second optical system 3, respectively, in the multiocular optical system unit 20 according to the present embodiment, but the present invention is not limited thereto.

That is, at least a part of the table may be stored in an apparatus such as a cloud computing system different from the first storing unit 206 and the second storing unit 306.

At this time, each of the first lens controller 204 and the second lens controller 304 obtains the target control amount from the table stored in the other apparatus via wireless communication or the like.

Thereby, it is possible to control the aperture amounts of the first light amount adjusting device 202 and the second light amount adjusting device 302.

As shown in FIG. 1, the camera body 1 includes a first image pickup element 102, a second image pickup element 103, a camera controller 104, the first camera communicating unit 105 and the second camera communicating unit 106.

The first image pickup element 102 and the second image pickup element 103 are each a complementary metal oxide semiconductor (CMOS) sensor or a charge coupled device (CCD) sensor, and obtain image data by receiving an optical image (an object image) formed via the first optical system 2 and the second optical system 3 to perform a photoelectric conversion, respectively.

Then, each of the first image pickup element 102 and the second image pickup element 103 outputs the obtained image data to the camera controller 104.

The first image pickup element 102 and the second image pickup element 103 are provided so as to correspond to the first image pickup optical system 201 and the second image pickup optical system 301, respectively, in the camera body 1, but the present invention is not limited thereto.

That is, a single image pickup element may be provided in the camera body 1, and the single image pickup element may receive a plurality of optical images from the first optical system 2 and the second optical system 3 and perform the photoelectric conversion to obtain a plurality of image data.

The camera controller 104 controls the first image pickup element 102 and the second image pickup element 103, and controls the first camera communicating unit 105 and the second camera communicating unit 106.

Specifically, the camera controller 104 transmits a target brightness to the first lens controller 204 and the second lens controller 304 via the first camera communicating unit 105, the second camera communicating unit 106, the first lens communicating unit 205 and the second lens communicating unit 305.

That is, the first camera communicating unit 105 and the second camera communicating unit 106 transmit information about the target brightness in the first optical system 2 and the second optical system 3, respectively.

Next, a control of the first light amount adjusting device 202 and the second light amount adjusting device 302 in the multiocular optical system unit 20 as the optical apparatus according to the present embodiment is described.

FIG. 2A shows a relationship between the control amounts for the first light amount adjusting device 202 and the brightnesses at the corresponding actual stop positions, and a relationship between the control amounts for the second light amount adjusting device 302 and the brightnesses at the corresponding actual stop positions.

In FIG. 2A, a change in the brightness at the actual stop position of the first light amount adjusting device 202 is indicated by a solid line, and a change in the brightness at the actual stop position of the second light amount adjusting device 302 is indicated by a broken line.

Further, the horizontal axis corresponds to the control amount (a stop control amount, an aperture diameter) in FIG. 2A, and as the control amount decreases, the aperture diameter of each of the first light amount adjusting device 202 and the second light amount adjusting device 302 increases more.

Furthermore, the vertical axis corresponds to the brightness (a stop value, a light amount), and the brightness at the actual stop position of each of the first light amount adjusting device 202 and the second light amount adjusting device 302 becomes brighter toward AV0.

That is, the brightness AV0 when the stop is fully opened is set in each of the first light amount adjusting device 202 and the second light amount adjusting device 302 by setting the control amount for each of the first light amount adjusting device 202 and the second light amount adjusting device 302 to 0.

In other words, the brightness AV0 corresponds to a light amount at the full-aperture diameter of each optical system, and may be determined by a predetermined fixed stop in the optical system, or may be determined by a jig or the like capable of setting a predetermined brightness by a predetermined aperture diameter.

It should be noted that AV0, AV1, AV2, . . . indicated on the vertical axis in FIG. 2A is not an actual AV value but a target brightness corresponding to the target control amounts 0, 1, 2, . . . .

Specifically, AV1, AV2, AV3, AV4 and AV5 are set so as to become darker by a predetermined step with respect to the brightness AV0 when the stop is fully opened.

Here, the target control amounts 0 to 5 and the target brightnesses AV0 to AV5 illustrated in FIG. 2A are examples, and the numbers of the target control amounts and the target brightnesses are not limited thereto, in the multiocular optical system unit 20 according to the present embodiment.

There is mechanical backlash such as backlash in connecting portions with respect to the first driving unit 203 and the second driving unit 303, and backlash in a cam mechanism for opening and closing a plurality of stop blades in each of the first light amount adjusting device 202 and the second light amount adjusting device 302.

Further, each of the first light amount adjusting device 202 and the second light amount adjusting device 302 has manufacturing variations in components.

Accordingly, even when the first light amount adjusting device 202 and the second light amount adjusting device 302 are controlled with the same control amount, the first light amount adjusting device 202 and the second light amount adjusting device 302 are driven to positions having different aperture diameters.

Then, a brightness at an actual stop position becomes different from each other since an individual difference occurs in the position where the aperture diameter is driven in each of the first light amount adjusting device 202 and the second light amount adjusting device 302.

In the example shown in FIG. 2A, even when the control is performed with the target control amount 5 for each of the first light amount adjusting device 202 and the second light amount adjusting device 302, the brightness at the corresponding actual stop position differs by A between the first light amount adjusting device 202 and the second light amount adjusting device 302.

Therefore, a difference in brightness occurs between optical images formed via the first optical system 2 and the second optical system 3 in the first image pickup element 102 and the second image pickup element 103, namely between image data to be obtained.

Accordingly, in the present embodiment, the control amounts for the first light amount adjusting device 202 and the second light amount adjusting device 302 are corrected such that the brightnesses at the corresponding actual stop positions of the first light amount adjusting device 202 and the second light amount adjusting device 302 become equal to each other in each control amount.

Next, a specific method of the correction is described in detail.

FIGS. 2B and 2C show a state in which the control amounts for the first light amount adjusting device 202 and the second light amount adjusting device 302 are corrected, respectively.

The correcting process described below may be performed by attaching the multiocular optical system unit 20 according to the present embodiment to an external device, or may be performed in the camera body 1 to which the multiocular optical system unit 20 according to the present embodiment is attached.

First, as shown in FIG. 2B, the target control amounts 0 to 5 (target aperture diameters) are set for the first light amount adjusting device 202 such that the target brightnesses AV0 to AV5 are set via the first light amount adjusting device 202 in the first optical system 2.

At this time, when the predetermined target control amount is set, the brightness at the actual stop position deviates from the corresponding target brightness as indicated by a black circle in FIG. 2B since there is the above-described backlash or manufacturing variation in the first light amount adjusting device 202.

Accordingly, in the present embodiment, the target control amount corresponding to each of the target brightnesses AV0 to AV5 (target light amount) is corrected by assuming that the brightness linearly changes according to a change in the control amount between adjacent target brightnesses among the target brightnesses AV0 to AV5.

In this manner, corrected target control amounts 0, 1a, 2a, 3a, 4a and 5a corresponding to the target brightnesses AV0, AV1, AV2, AV3, AV4 and AV5 are determined as indicated by white circles in FIG. 2B.

Also in the second optical system 3, the corrected target control amounts 0, 1b, 2b, 3b, 4b and 5b corresponding to the target brightnesses AV0, AV1, AV2, AV3, AV4 and AV5 are determined by performing the same correcting process as described above, as shown in FIG. 2C.

In other words, the relationship between the control amounts as the aperture diameters of the stop serving as the first light amount adjusting device 202 and the brightnesses as the light amount is measured in the first optical system 2.

Then, the target control amounts 0 to 5 as the target aperture diameters of the stop corresponding to the target brightnesses AV0 to AV5 as the target light amounts are corrected to the corrected target control amounts 0 to 5a based on the measurement result.

Similarly, the relationship between the control amounts as the aperture diameter of the stop serving as the second light amount adjusting device 302 and the brightnesses as the light amount is measured in the second optical system 3.

Then, the target control amounts 0 to 5 as the target aperture diameters of the stop corresponding to the target brightnesses AV0 to AV5 as the target light amounts are corrected to the corrected target control amounts 0 to 5b based on the measurement result. Note that the corrected target control amount is not limited to this, and a correction value that is a difference from the target control amount may be used.

Tables 1 and 2 show the target brightnesses, the corresponding target control amounts and the corresponding corrected target control amounts in the first optical system 2 and the second optical system 3 in the multiocular optical system unit 20 according to the present embodiment, respectively.

TABLE 1

| Target brightness | AV0(1) | AV1(1) | AV2(1) | AV3(1) | AV4(1) | AV5(1) |
|---|---|---|---|---|---|---|
| Target control amount | 0 | 1 | 2 | 3 | 4 | 5 |
| Corrected target control amount | 0 | 1a | 2a | 3a | 4a | 5a |

TABLE 2

| Target brightness | AV0(2) | AV1(2) | AV2(2) | AV3(2) | AV4(2) | AV5(2) |
|---|---|---|---|---|---|---|
| Target control amount | 0 | 1 | 2 | 3 | 4 | 5 |
| Corrected target control amount | 0 | 1b | 2b | 3b | 4b | 5b |

Note that (1) and (2) are added to the target brightnesses AV0 and AV5 in the first optical system 2 and the second optical system 3 in Tables 1 and 2, respectively, to facilitate understanding.

In the above-described correction, each of the target control amounts 1 to 5 is corrected with reference to the target control amount 0 and the corresponding target brightness AV0, but the present invention is not limited thereto.

That is, each target control amount may be corrected with reference to a predetermined target control amount other than the target control amount 0 and the corresponding target brightness.

However, the reference target control amount and the corresponding target brightness are required to be the same with each other such that the brightnesses coincide with each other between the first optical system 2 and the second optical system 3.

FIG. 3 shows the relationship between the corrected control amounts for the first light amount adjusting device 202 and the brightnesses at the corresponding actual stop positions, and the relationship between the corrected control amounts for the second light amount adjusting device 302 and the brightnesses at the corresponding actual stop positions.

Note that adjacent corrected target control amounts among the corrected target control amounts 0 to 5a are not equally spaced from each other, and adjacent corrected target control amounts among the corrected target control amounts 0 to 5b are not equally spaced from each other, as indicated by black arrows in FIGS. 2B and 2C.

Accordingly, it should be noted that the corrected target control amounts 1a to 5a and the corrected target control amounts 1b to 5b do not actually coincide with each other in FIG. 3.

On the vertical axis, scales are shown for the target brightnesses AV0(1) to AV5(1), whereas scales are not shown for the target brightnesses AV0(2) to AV5(2).

As shown in FIG. 3, it is possible to set a predetermined brightness at the corresponding actual stop positions of the first light amount adjusting device 202 and the second light amount adjusting device 302 by correcting the control amounts for each of the first light amount adjusting device 202 and the second light amount adjusting device 302.

In other words, it is possible to set the target brightness in each of the first optical system 2 and the second optical system 3 by changing an interval between the control amounts for each of the first light amount adjusting device 202 and the second light amount adjusting device 302 according to the control amount.

In still other words, it is possible to set the target brightness in each of the first optical system 2 and the second optical system 3 by changing a driving amount of the stop blades provided in each of the first light amount adjusting device 202 and the second light amount adjusting device 302 according to positions of the stop blades.

The correction table determined as shown in Table 1 is stored in the first storing unit 206 in the first optical system 2, and the correction table determined as shown in Table 2 is stored in the second storing unit 306 in the second optical system 3.

When the image pickup apparatus 10 is used, the correction tables are read from the first storing unit 206 and the second storing unit 306 by the first lens controller 204 and the second lens controller 304.

Next, when the target brightness is set in each of the first optical system 2 and the second optical system 3 based on the instruction from the camera controller 104, the first lens controller 204 and the second lens controller 304 determine the corresponding corrected target control amounts by referring to the correction tables.

Then, the first lens controller 204 and the second lens controller 304 controls a drive of the first driving unit 203 and the second driving unit 303 based on the determined corrected target control amounts, respectively.

Thereby, it is possible to set the aperture diameter in each of the first light amount adjusting device 202 and the second light amount adjusting device 302 with a high accuracy.

As described above, in the multiocular optical system unit 20 according to the present embodiment, the corrected control amounts are set for the first light amount adjusting device 202 and the second light amount adjusting device 302 in the first optical system 2 and the second optical system 3, as shown in FIG. 3.

As a result, it is possible to set a predetermined brightness in each of the first optical system 2 and the second optical system 3, and thus a change in the brightness can coincide with each other between the first optical system 2 and the second optical system 3.

Accordingly, it is possible to reduce a difference in the brightness between two images obtained via the first optical system 2 and the second optical system 3.

That is, it is possible to provide a multiocular optical system capable of performing a control with a high light amount accuracy to reduce a light amount difference between images obtained by instructing the same brightness to the provided optical systems according to the present embodiment.

Second Embodiment

FIGS. 4A and 4B show a state in which the control amounts for the first light amount adjusting device 202 and the second light amount adjusting device 302 are corrected in a multiocular optical system unit according to a second embodiment of the present invention, respectively.

Since the multiocular optical system unit according to the present embodiment has the same structure as that of the multiocular optical system unit 20 according to the first embodiment, the same members are denoted by the same reference numerals, and the description thereof is omitted.

In the multiocular optical system unit 20 according to the first embodiment, the corrected control amounts for the first light amount adjusting device 202 and the second light amount adjusting device 302 are set in the first optical system 2 and the second optical system 3.

Thereby, the change in the brightness can coincide with each other between the first optical system 2 and the second optical system 3.

On the other hand, a difference in the brightness remains as indicated by B in FIG. 3 since the reference target control amount and the corresponding target brightness, namely the target control amount 0 and the target brightness AV0 are independently used in each of the first optical system 2 and the second optical system 3.

This difference is due to a presence of optical variations which affect the brightness, such as a fixed variation and a transmissivity variation in the first optical system 2 and the second optical system 3, in addition to mechanical backlash and a manufacturing variation in the first light amount adjusting device 202 and the second light amount adjusting device 302.

Here, when a plurality of image pickup elements corresponding to a plurality of optical systems are provided as in the camera body 1, light amounts of obtained images can coincide with each other by adjusting a sensitivity of each of the plurality of image pickup elements.

However, when an image pickup area of a single image pickup element is divided into a plurality of areas to obtain a plurality of images via a plurality of optical systems, it is difficult to adjust the sensitivity of each area in accordance with the light amount of each image.

Accordingly, in the multiocular optical system unit according to the present embodiment, the control amount is corrected in each optical system based on a reference target control amount and the corresponding target brightness in a predetermined optical system among the plurality of optical systems.

Specifically, first, in the multiocular optical system unit according to the present embodiment, it is assumed that the relationship between the control amounts and the brightnesses as shown in FIG. 2A is obtained in the first optical system 2 and the second optical system 3 as in the first embodiment.

At this time, the corrected target control amounts 1a to 5a corresponding to the target brightnesses AV1(1) to AV5(1) are determined as indicated by white circles in FIG. 4A by correcting the target control amounts in the first optical system 2 in the same manner as in the first embodiment.

Next, in the second optical system 3, the target control amounts corresponding to the target brightnesses AV1(1) to AV5(1) are determined with reference to the target control amount 0 and the corresponding target brightness AV0(1) in the first optical system 2.

That is, the corrected target control amounts 1c to 5c corresponding to the target brightnesses AV1(1) to AV5(1) are determined as indicated by white circles in FIG. 4B.

In other words, for the second optical system 3, first, a difference between the target brightness AV0(2) (a first light amount) at the target control amount 0 (a predetermined aperture diameter, a full-aperture diameter) in the second optical system 3 and the target brightness AV0(1) at the target control amount 0 in the first optical system 2 is obtained.

Next, the target brightnesses as the target light amounts in the second optical system 3 are corrected from "AV1(2) to AV5(2)" to "AV1(1) to AV5(1)" based on the obtained difference.

Then, the corrected target control amounts 1c to 5c as the target aperture diameters of the stop serving as the second light amount adjusting device 302 corresponding to the corrected target brightnesses AV1(1) to AV5(1) as the target light amounts are determined.

Tables 3 and 4 show the target brightnesses, the corresponding target control amounts and the corresponding corrected target control amounts in the first optical system 2 and the second optical system 3 in the multiocular optical system unit according to the present embodiment, respectively.

TABLE 3

| Target brightness | AV0(1) | AV1(1) | AV2(1) | AV3(1) | AV4(1) | AV5(1) |
|---|---|---|---|---|---|---|
| Target control amount | 0 | 1 | 2 | 3 | 4 | 5 |
| Corrected target control amount | 0 | 1a | 2a | 3a | 4a | 5a |

TABLE 4

| Target brightness | AV0(2) | AV1(1) | AV2(1) | AV3(1) | AV4(1) | AV5(1) |
|---|---|---|---|---|---|---|
| Target control amount | 0 | 1 | 2 | 3 | 4 | 5 |
| Corrected target control amount | 0 | 1c | 2c | 3c | 4c | 5c |

FIG. 4C shows the relationship between the corrected control amounts for the first light amount adjusting device 202 and the brightnesses at the corresponding actual stop positions, and the relationship between the corrected control amounts for the second light amount adjusting device 302 and the brightnesses at the corresponding actual stop positions.

As shown in FIG. 4C, in the multiocular optical system unit according to the present embodiment, it is possible to set a predetermined brightness at the corresponding actual stop positions of the first light amount adjusting device 202 and the second light amount adjusting device 302 as in the first embodiment.

In addition, it can be seen that the multiocular optical system unit according to the present embodiment can also reduce the difference in the brightness remaining between the first optical system 2 and the second optical system 3 in the multiocular optical system unit 20 according to the first embodiment.

The correction table determined as shown in Table 3 is stored in the first storing unit 206 in the first optical system 2, and the correction table determined as shown in Table 4 is stored in the second storing unit 306 in the second optical system 3.

When the image pickup apparatus 10 is used, the correction tables are read from the first storing unit 206 and the second storing unit 306 by the first lens controller 204 and the second lens controller 304.

Next, when the target brightness is set in each of the first optical system 2 and the second optical system 3 based on the instruction from the camera controller 104, the first lens controller 204 and the second lens controller 304 determine the corresponding corrected target control amounts by referring to the correction tables.

Then, the first lens controller 204 and the second lens controller 304 controls a drive of the first driving unit 203 and the second driving unit 303 based on the determined corrected target control amounts, respectively.

Thereby, it is possible to set the aperture diameter in each of the first light amount adjusting device 202 and the second light amount adjusting device 302 with a high accuracy.

As described above, in the multiocular optical system unit according to the present embodiment, the corrected control amounts are set for the first light amount adjusting device 202 and the second light amount adjusting device 302 in the first optical system 2 and the second optical system 3, as shown in FIG. 4C.

As a result, it is possible to set a predetermined brightness in each of the first optical system 2 and the second optical system 3, and thus a change in the brightness can coincide with each other between the first optical system 2 and the second optical system 3.

Accordingly, it is possible to reduce a difference in the brightness between two images obtained via the first optical system 2 and the second optical system 3.

That is, it is possible to provide a multiocular optical system capable of performing a control with a high light amount accuracy to further reduce a light amount difference between images obtained by instructing the same brightness by considering an optical variation in each optical system, according to the present embodiment.

In the above-described correction in the multiocular optical system unit according to the present embodiment, the target control amounts in each of the first optical system 2 and the second optical system 3 are corrected with reference to the target control amount 0 and the corresponding target brightness AV0(1) in the first optical system 2, but the present invention is not limited thereto.

That is, the target control amounts in each of the first optical system 2 and the second optical system 3 may be corrected with reference to a predetermined target control amount other than the target control amount 0 and the corresponding target brightness in the first optical system 2.

Further, the target control amounts in each of the first optical system 2 and the second optical system 3 may be corrected with reference to a predetermined target control amount and the corresponding target brightness in the second optical system 3.

Third Embodiment

Figures 5A, 5B, 5C, 6A, 6B:
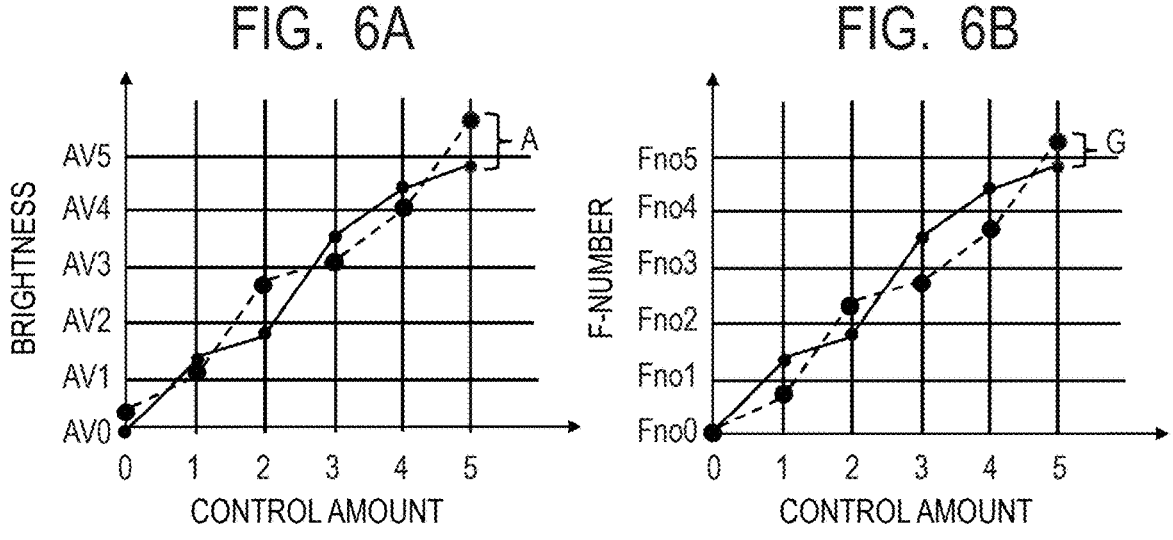
FIG. 5A is a graph showing a state in which the control amount is corrected in a multiocular optical system unit according to a third embodiment of the present invention.
FIG. 5B is a graph showing a state in which the control amount is corrected in the multiocular optical system unit according to the third embodiment.
FIG. 5C is a graph showing a relationship between the corrected control amounts and the brightnesses in the multiocular optical system unit according to the third embodiment.
FIG. 6A is a graph showing a relationship between the control amounts and the brightnesses in a multiocular optical system unit according to a fourth embodiment of the present invention.
FIG. 6B is a graph showing a relationship between the control amounts and F-numbers in the multiocular optical system unit according to the fourth embodiment.

FIGS. 5A and 5B show a state in which the control amounts for the first light amount adjusting device 202 and the second light amount adjusting device 302 are corrected in a multiocular optical system unit according to a third embodiment of the present invention, respectively.

Since the multiocular optical system unit according to the present embodiment has the same structure as that of the multiocular optical system unit 20 according to the first embodiment, the same members are denoted by the same reference numerals, and the description thereof is omitted.

In the multiocular optical system unit according to the second embodiment, the corrected target control amounts for the first light amount adjusting device 202 and the second light amount adjusting device 302 are set with reference to the target control amount 0 and the corresponding target brightness AV0(1) in the first optical system 2.

Thereby, a change in the brightness can coincide with each other between the first optical system 2 and the second optical system 3.

On the other hand, in the second optical system 3, the value of the brightness AV0(2) when the stop is fully opened in the second light amount adjusting device 302 is larger than the value of the brightness AV0(1) when the stop is fully opened in the first light amount adjusting device 202 in the first optical system 2.

That is, the brightness when the stop is fully opened in the second light amount adjusting device 302 is darker than the brightness when the stop is fully opened in the first light amount adjusting device 202.

Therefore, even if an attempt is made to determine the target control amount so as to correspond to the target brightness AV0(1) in the second optical system 3 with reference to the target control amount 0 and the corresponding target brightness AV0(1) in the first optical system 2, such control amount does not exist.

In other words, it is not possible to further open the stop so as to be brighter than the brightness AV0(2) at the full-aperture diameter in the second optical system 3.

Accordingly, a difference in the brightness remains in the vicinity of the control amount 0 as indicated by C in FIG. 4C between the first optical system 2 and the second optical system 3.

Therefore, in the multiocular optical system unit according to the present embodiment, the target control amounts in each optical system are determined based on a reference target control amount and the corresponding target brightness in a predetermined optical system in which the brightness at the control amount 0 is the darkest among the plurality of optical systems.

Specifically, first, in the multiocular optical system unit according to the present embodiment, it is assumed that the relationship between the control amounts and the brightnesses as shown in FIG. 2A is obtained in each of the first optical system 2 and the second optical system 3 as in the first embodiment.

Here, an optical system in which the brightness at the target control amount 0 is the darkest, in other words, the value of the target brightness AV0 at the target control amount 0 is the largest is the second optical system 3 between the first optical system 2 and the second optical system 3.

Therefore, in the first optical system 2, the target control amounts corresponding to the target brightnesses AV0(2) and AV5(2) are determined with reference to the target control amount 0 and the corresponding target brightness AV0(2) in the second optical system 3.

That is, the corrected target control amounts 0d to 5d corresponding to the target brightnesses AV0(2) to AV5(2) are determined as indicated by white circles in FIG. 5A.

In other words, for the first optical system 2, first, a difference between the target brightness AV0(1) at the target control amount 0 in the first optical system 2 and the target brightness AV0(2) at the target control amount 0 in the second optical system 3 is obtained.

Here, the second optical system 3 is an optical system in which the brightness AV0 at the full-aperture diameter is the largest, namely the brightness is the darkest, in other words, the light amount is the smallest between the first optical system 2 and the second optical system 3.

Next, the target brightnesses as the target light amounts in the first optical system 2 are corrected from "AV0(1) to AV5(1)" to "AV0(2) to AV5(2)" based on the obtained difference.

Then, the corrected target control amounts 0d to 5d as the target aperture diameters of the stop serving as the first light amount adjusting device 202 corresponding to the corrected target brightnesses AV0(2) to AV5(2) as the target light amounts are determined.

Next, in the second optical system 3, the target control amounts 1 to 5 corresponding to the target brightnesses AV1(2) to AV5(2) are corrected with reference to the target control amount 0 and the corresponding target brightness AV0(2) in the second optical system 3.

That is, the corrected target control amounts 1b to 5b corresponding to the target brightnesses AV1(2) to AV5(2) are determined as indicated by white circles in FIG. 5B.

Tables 5 and 6 show the target brightnesses, the corresponding target control amounts and the corresponding corrected target control amounts in the first optical system 2 and the second optical system 3 in the multiocular optical system unit according to the present embodiment, respectively.

TABLE 5

| Target brightness | AV0(2) | AV1(2) | AV2(2) | AV3(2) | AV4(2) | AV5(2) |
|---|---|---|---|---|---|---|
| Target control amount | 0 | 1 | 2 | 3 | 4 | 5 |
| Corrected target control amount | 0d | 1d | 2d | 3d | 4d | 5d |

TABLE 6

| Target brightness | AV0(2) | AV1(2) | AV2(2) | AV3(2) | AV4(2) | AV5(2) |
|---|---|---|---|---|---|---|
| Target control amount | 0 | 1 | 2 | 3 | 4 | 5 |
| Corrected target control amount | 0 | 1b | 2b | 3b | 4b | 5b |

FIG. 5C shows the relationship between the corrected control amounts for the first light amount adjusting device 202 and the brightnesses at the corresponding actual stop positions, and the relationship between the corrected control amounts for the second light amount adjusting device 302 and the brightnesses at the corresponding actual stop positions.

As shown in FIG. 5C, in the multiocular optical system unit according to the present embodiment, it is possible to set a predetermined brightness at the corresponding actual stop positions of the first light amount adjusting device 202 and the second light amount adjusting device 302 as in the first embodiment.

In addition, it can be seen that the multiocular optical system unit according to the present embodiment can also reduce the difference in the brightness remaining between the first optical system 2 and the second optical system 3 in the multiocular optical system units according to the first and second embodiments.

The correction table determined as shown in Table 5 is stored in the first storing unit 206 in the first optical system 2, and the correction table determined as shown in Table 6 is stored in the second storing unit 306 in the second optical system 3.

When the image pickup apparatus 10 is used, the correction tables are read from the first storing unit 206 and the second storing unit 306 by the first lens controller 204 and the second lens controller 304.

Next, when the target brightness is set in each of the first optical system 2 and the second optical system 3 based on the instruction from the camera controller 104, the first lens controller 204 and the second lens controller 304 determine the corresponding corrected target control amounts by referring to the correction tables.

Then, the first lens controller 204 and the second lens controller 304 controls a drive of the first driving unit 203 and the second driving unit 303 based on the determined corrected target control amounts, respectively.

Thereby, it is possible to set the aperture diameter in each of the first light amount adjusting device 202 and the second light amount adjusting device 302 with a high accuracy.

As described above, in the multiocular optical system unit according to the present embodiment, the corrected control amounts are set for the first light amount adjusting device 202 and the second light amount adjusting device 302 in the first optical system 2 and the second optical system 3, as shown in FIG. 5C.

As a result, it is possible to set a predetermined brightness in each of the first optical system 2 and the second optical system 3, and thus a change in the brightness can coincide with each other between the first optical system 2 and the second optical system 3.

Accordingly, it is possible to reduce a difference in the brightness between two images obtained via the first optical system 2 and the second optical system 3.

That is, it is possible to provide a multiocular optical system capable of performing a control with a high light amount accuracy to reduce a light amount difference between images obtained by instructing the same brightness over an entire driving range of the light amount adjusting device in each optical system according to the present embodiment.

Fourth Embodiment

When a stop is provided as a light amount adjusting device in each of a plurality of optical systems and an aperture diameter of each stop is adjusted in order to reduce a difference in brightness among a plurality of videos or images, there is a possibility that an error of an F-number does not fall within an allowable range in the optical system in which the aperture diameter of the stop is adjusted.

Further, the full-aperture diameter of the optical system is typically determined by the aperture diameter of a predetermined fixed stop in order to ensure an accuracy of the F-number since the allowable range is narrow in a full-aperture diameter of the optical system.

Therefore, when the aperture diameter of each stop is adjusted in order to reduce the difference in the brightness particularly in the vicinity of the full-aperture diameter of the optical system, the error of the F-number may not fall within the allowable range due to the decrease in the aperture diameter of the optical system.

Accordingly, an object of the present embodiment is to provide a multiocular optical system unit capable of performing a control with a high light amount accuracy by reducing the light amount difference among the optical systems with satisfying a specification regarding the F-number without performing signal processing, image processing or the like during use.

FIG. 6A shows a relationship between the control amounts for the first light amount adjusting device 202 and the brightnesses at the corresponding actual stop positions, and a relationship between the control amounts for the second light amount adjusting device 302 and the brightnesses at the corresponding actual stop positions in a multiocular optical system unit according to a fourth embodiment of the present invention.

Further, FIG. 6B shows a relationship between the control amounts for the first light amount adjusting device 202 and the corresponding F-numbers, and a relationship between the control amounts for the second light amount adjusting device 302 and the corresponding F-numbers.

Since the multiocular optical system unit according to the present embodiment has the same structure as that of the multiocular optical system unit 20 according to the first embodiment, the same members are denoted by the same reference numerals, and the description thereof is omitted.

In FIGS. 6A and 6B, a change in the first light amount adjusting device 202 is indicated by a solid line, and a change in the second light amount adjusting device 302 is indicated by a broken line.

The horizontal axis corresponds to the control amount (a stop control amount, an aperture diameter) in FIGS. 6A and 6B.

Further, the vertical axis in FIG. 6A corresponds to the brightness (a stop value, a light amount), and the brightness at the actual stop position of each of the first light amount adjusting device 202 and the second light amount adjusting device 302 becomes brighter toward the AV0.

Furthermore, the vertical axis in FIG. 6B corresponds to the F-number, namely the value obtained by dividing the focal length in the optical system by the aperture diameter (a pupil diameter).

Here, it can be interpreted that the vertical axis in FIG. 6B indicates the aperture diameter of the optical system since the focal length does not change when the control amounts for the first light amount adjusting device 202 and the second light amount adjusting device 302 are changed.

That is, with respect to the vertical axis in FIG. 6B, the aperture diameter in each of the first optical system 2 and the second optical system 3 increases toward the Fno0, and the aperture diameter reaches the full-aperture diameter at the Fno0.

From the above description, the brightness AV0 and the F-number Fno0 when the stop is fully opened are set in the first light amount adjusting device 202 and the second light amount adjusting device 302 by setting the control amounts for the first light amount adjusting device 202 and the second light amount adjusting device 302 to 0.

In other words, the brightness AV0 corresponds to the light amount at the full-aperture diameter of each optical system, and may be determined by a predetermined fixed aperture in the optical system, or may be determined by a jig or the like capable of setting a predetermined brightness by a predetermined aperture diameter.

It should be noted that AV0, AV1, AV2, . . . indicated on the vertical axis in FIG. 6A indicate not the actual AV values but the target brightnesses corresponding to the target control amounts 0, 1, 2, . . . .

Specifically, AV1, AV2, AV3, AV4 and AV5 are set so as to become darker by a predetermined step with respect to the brightness AV0 at the target control amount 0, namely when the stop is fully opened.

Further, Fno0, Fno1, Fno2, . . . indicated on the vertical axis in FIG. 6B indicate not the actual values of the F-number but the target F-numbers corresponding to the target control amounts 0, 1, 2, . . . .

Here, the target control amounts 0 to 5, the target brightnesses AV0 to AV5, and the target F-numbers Fno0 to Fno5 shown in FIGS. 6A and 6B are examples in the multiocular optical system unit according to the present embodiment. That is, the numbers of the target control amounts, the target brightnesses, and the target F-numbers are not limited thereto.

There is mechanical backlash such as backlash in connecting portions with respect to the first driving unit 203 and the second driving unit 303, and backlash in a cam mechanism for opening and closing a plurality of stop blades in the first light amount adjusting device 202 and the second light amount adjusting device 302, respectively.

Further, each of the first light amount adjusting device 202 and the second light amount adjusting device 302 has manufacturing variations in components.

Therefore, the first light amount adjusting device 202 and the second light amount adjusting device 302 are driven to positions having different aperture diameters, even when the first light amount adjusting device 202 and the second light amount adjusting device 302 are controlled with the same control amount.

Further, there are optical variations which affect the brightness, such as manufacturing variations and transmissivity variations of the lenses in the first optical system 2 and the second optical system 3.

As described above, the brightness at the actual stop position in each of the first light amount adjusting device 202 and the second light amount adjusting device 302 is different from each other due to the existence of the mechanical variations and the optical variations.

In the example shown in FIG. 6A, even when the control is performed with the target control amount 5 for each of the first light amount adjusting device 202 and the second light amount adjusting device 302, the brightness at the corresponding actual stop position differs by A between the first light amount adjusting device 202 and the second light amount adjusting device 302.

Therefore, a difference in the brightness occurs between the optical images formed via the first optical system 2 and the second optical system 3, namely the obtained image data in the first image pickup element 102 and the second image pickup element 103.

On the other hand, when each of the first light amount adjusting device 202 and the second light amount adjusting device 302 is controlled with the target control amount 5, a difference in the F-number between the first light amount adjusting device 202 and the second light amount adjusting device 302 is G which is smaller than A, as shown in FIG. 6B.

This is because the F-number does not include the influence of the transmissivity, namely the optical variations from the definition described above.

Further, the difference in the F-number at the target control amount 0, namely in Fno0 between the first optical system 2 and the second optical system 3 becomes substantially 0 since the full-aperture diameter of the optical system corresponding to the target control amount 0 is typically set to a fixed aperture, as shown in FIG. 6B.

FIG. 11A shows a state in which the control amounts for the first light amount adjusting device 202 and the second light amount adjusting device 302 are corrected in a conventional multiocular optical system unit.

Since the conventional multiocular optical system unit shown herein has the same structure as that of the multiocular optical system unit according to the present embodiment, the same members are denoted by the same reference numerals, and description thereof is omitted.

First, in the conventional multiocular optical system unit, it is assumed that the relationship between the control amounts and the brightnesses as shown in FIG. 6A is obtained in each of the first optical system 2 and the second optical system 3 as in the multiocular optical system unit according to the present embodiment.

Further, in the conventional multiocular optical system unit, it is assumed that the relationship between the control amounts and the F-numbers as shown in FIG. 6B is obtained in each of the first optical system 2 and the second optical system 3 as in the multiocular optical system unit according to the present embodiment.

For easy understanding, the brightnesses measured at the target control amounts 0, 1, 2, 3, 4 and 5 in the second optical system 3 are represented by AV0', AV1', AV2', AV3', AV4' and AV5', respectively.

In addition, it is assumed that the brightness linearly changes according to a change in the control amount between adjacent target brightnesses among the target brightnesses AV0 to AV5 (target light amounts).

In the conventional multiocular optical system unit, the target control amounts are corrected such that the target brightness in the first optical system 2 and the target brightness in the second optical system 3 become equal to each other in each target control amount.

Specifically, in the first optical system 2, the target control amounts 0 to 5 are corrected such that the target brightnesses AV0 to AV5 are corrected to the brightnesses AV0' to AV5' in the second optical system 3, respectively.

That is, the corrected target control amounts 0f, 1f, 2f, 3f, 4f and 5f corresponding to the target brightnesses AV0', AV1', AV2', AV3', AV4' and AV5' are determined as indicated by white circles in FIG. 11A.

Table 7 shows the target brightnesses, the corresponding target control amounts and the corresponding corrected target control amounts in the first optical system 2 in the conventional multiocular optical system unit.

TABLE 7

| Target brightness | AV0' | AV1' | AV2' | AV3' | AV4' | AV5' |
|---|---|---|---|---|---|---|
| Target control amount | 0 | 1 | 2 | 3 | 4 | 5 |
| Corrected target control amount | 0f | 1f | 2f | 3f | 4f | 5f |

FIG. 11B shows a relationship between the corrected control amounts for the first light amount adjusting device 202 and the brightnesses at the corresponding actual stop positions in the conventional multiocular optical system unit.

Further, FIG. 11B shows a relationship between the control amounts for the second light amount adjusting device 302 and the brightnesses at the corresponding actual stop positions in the conventional multiocular optical system unit.

Note that adjacent corrected target control amounts among the corrected target control amounts 0f to 5f for the first light amount adjusting device 202 are not equally spaced from each other.

That is, it should be noted that the corrected target control amounts 0f to 5f for the first light amount adjusting device 202 and the target control amounts 0 to 5 for the second light amount adjusting device 302 do not actually coincide with each other in FIG. 11B.

The same applies to FIG. 11C described below.

As shown in FIG. 11B, it can be seen that the brightness in the first optical system 2 and that in the second optical system 3 are equal to each other in each control amount by correcting the control amount for the first light amount adjusting device 202.

FIG. 11C shows a relationship between the corrected control amounts for the first light amount adjusting device 202 and the corresponding F-numbers, and a relationship between the control amounts for the second light amount adjusting device 302 and the corresponding F-numbers in the conventional multiocular optical system unit.

As described above, the control amounts as the aperture diameters of the stop serving as the first light amount adjusting device 202 are corrected such that the brightness in the first optical system 2 and that in the second optical system 3 coincide with each other in each control amount in the conventional multiocular optical system unit.

Thereby, the F-numbers at respective target control amounts in the first optical system 2 are changed, so that the relationship between the control amounts for the first light amount adjusting device 202 and the corresponding F-numbers shown in FIG. 6B is changed as indicated by white circles in FIG. 11C.

That is, even when the control amount for the first light amount adjusting device 202 is corrected, a difference indicated by H still remains between the F-numbers of the first optical system 2 and the second optical system 3 in each control amount as shown in FIG. 11C.

This difference is caused by the influence of the transmissivity, namely the optical variations in the first optical system 2 and the second optical system 3 as described above.

In an image pickup apparatus, the F-number is generally displayed as a numerical value, and an allowable range of an error is set for each F-number as indicated by arrows in FIG. 11C (see ISO517; 1996).

When the correction is performed in consideration of only the brightness as in the conventional multiocular optical system unit, each of the F-numbers at the corrected target control amounts 0f, 2f and 5f in the first optical system 2 deviates from the allowable range of the error as shown in FIG. 11C.

In particular, the allowable range of the error of the F-number at the full-aperture diameter of the optical system corresponding to the target control amount 0 is often set narrower than the allowable ranges of the errors of the F-numbers at the aperture diameters of the optical systems corresponding to the other control amounts.

Therefore, as described above, the full-aperture diameter of the optical system corresponding to the target control amount 0 is often set to a fixed aperture, and the F-number Fno0 particularly at the target control amount 0 deviates from the allowable range of the error when the correction is performed in consideration of only the brightness as in the conventional multiocular optical system unit.

Accordingly, in the present embodiment, the control amounts for each light amount adjusting device are corrected in consideration of the F-number in each optical system as described in detail below.

Figures 7A, 7B, 8A, 8B, 9A, 9B:
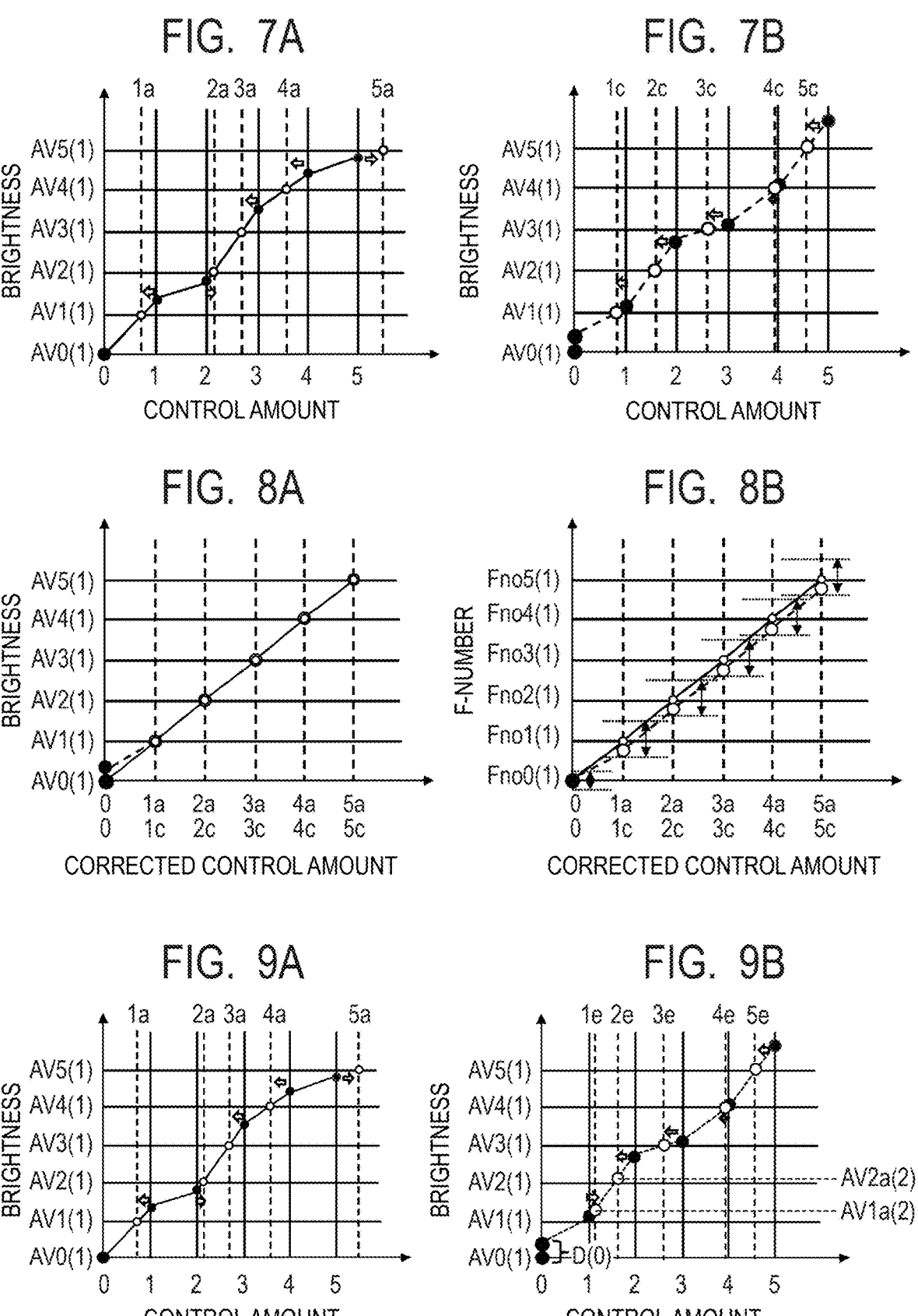
FIG. 7A is a graph showing a state in which the control amount is corrected in the multiocular optical system unit according to the fourth embodiment.
FIG. 7B is a graph showing a state in which the control amount is corrected in the multiocular optical system unit according to the fourth embodiment.
FIG. 8A is a graph showing a relationship between the corrected control amounts and the brightnesses in the multiocular optical system unit according to the fourth embodiment.
FIG. 8B is a graph showing a relationship between the corrected control amounts and the F-numbers in the multiocular optical system unit according to the fourth embodiment.
FIG. 9A is a graph showing a state in which the control amount is corrected in a multiocular optical system unit according to a fifth embodiment of the present invention.
FIG. 9B is a graph showing a state in which the control amount is corrected in the multiocular optical system unit according to the fifth embodiment.

FIGS. 7A and 7B show a state in which the control amounts for the first light amount adjusting device 202 and the second light amount adjusting device 302 are corrected in the multiocular optical system unit according to the present embodiment, respectively.

The correcting process described below may be performed by attaching the multiocular optical system unit according to the present embodiment to an external apparatus, or may be performed in the camera body 1 to which the multiocular optical system unit according to the present embodiment is attached.

In the multiocular optical system unit according to the present embodiment, the relationship between the control amounts and the brightnesses at the corresponding actual stop positions shown in FIG. 6A is corrected in consideration of the relationship between the control amounts and the corresponding F-numbers shown in FIG. 6B.

Specifically, first, for the first optical system 2, the target control amounts 1 to 5 are corrected so as to correspond to the target brightnesses AV1(1) to AV5(1) with reference to the target control amount 0 and the corresponding target brightness AV0(1).

That is, with respect to the target control amounts 1 to 5, the corrected target control amounts corresponding to the target brightnesses AV1(1) to AV5(1) are determined with reference to the target control amount 0 and the corresponding target brightness AV0(1).

Thereby, the corrected target control amounts 1a, 2a, 3a, 4a and 5a corresponding to the target brightnesses AV1(1), AV2(1), AV3(1), AV4(1) and AV5(1) are determined as indicated by white circles in FIG. 7A.

Next, for the second optical system 3, first, the target control amount 0 corresponding to the full-aperture diameter of the optical system is allocated to a first correction region (a first aperture diameter region), and the remaining target control amounts on the close side of the target control amount 0 are allocated to a second correction region (a second aperture diameter region).

That is, the first correction region is defined by the target control amount 0 corresponding to the full-aperture diameter of the optical system, and the second correction region is defined by the remaining target control amounts on the close side of the target control amount 0.

Then, with respect to the target control amounts 1 to 5 included in the second correction region, the target control amounts 1 to 5 are corrected so as to correspond to the target brightnesses AV1(1) to AV5(1) with reference to the target control amount 0 and the corresponding target brightness AV0(1) in the first optical system 2.

That is, for the target control amounts 1 to 5, the corrected target control amounts corresponding to the target brightnesses AV1(1) to AV5(1) are determined with reference to the target control amount 0 and the corresponding target brightness AV0(1) in the first optical system 2.

In other words, in the second optical system 3, the target brightnesses at the target control amounts 1 to 5 are corrected based on a difference between the target brightness AV0(1) at the target control amount 0 in the first optical system 2 and the target brightness AV0(2) at the target control amount 0 in the second optical system 3.

Thereby, the corrected target control amounts 1c, 2c, 3c, 4c and 5c corresponding to the target brightnesses AV1(1), AV2(1), AV3(1), AV4(1) and AV5(1) are determined as indicated by white circles in FIG. 7B.

On the other hand, the target control amount 0 included in the first correction region is not corrected.

That is, the target control amount 0(a first aperture diameter) in each of the first optical system 2 and the second optical system 3 is maintained at the same amount.

Thereby, the brightness AV0(1) and the brightness AV0(2) (a first light amount) at the target control amount 0 in the first optical system 2 and the second optical system 3 are maintained, respectively.

Note that the above-described correction of the target control amount included in the second correction region in the second optical system 3 may be performed with reference to a predetermined control amount and the corresponding brightness (a second light amount) in the first optical system 2.

In other words, the relationship between the control amounts as the aperture diameters of the stop serving as the first light amount adjusting device 202 and the second light amount adjusting device 302 and the brightnesses as the light amounts is measured in the first optical system 2 and the second optical system 3, respectively.

Then, the target control amounts 0 to 5 as the target aperture diameters of the stop corresponding to the target brightnesses AV0 to AV5 as the target light amounts are corrected based on the measurement result.

Table 8 shows the target brightnesses, the corresponding target control amounts and the corresponding corrected target control amounts in the first optical system 2.

TABLE 8

| Target brightness | AV0(1) | AV1(1) | AV2(1) | AV3(1) | AV4(1) | AV5(1) |
|---|---|---|---|---|---|---|
| Target control amount | 0 | 1 | 2 | 3 | 4 | 5 |
| Corrected target control amount | 0 | 1a | 2a | 3a | 4a | 5a |

Further, Table 9 shows the target brightness, the corresponding target control amount and the corresponding corrected target control amount in the first correction region in the second optical system 3 as a first table.

Furthermore, Table 10 shows the target brightnesses, the corresponding target control amounts and the corresponding corrected target control amounts in the second correction region in the second optical system 3 as a second table.

TABLE 9

| Target brightness | AV0(2) |
|---|---|
| Target control amount | 0 |

TABLE 9-continued

| Target brightness | AV0(2) |
|---|---|
| Corrected target control amount | 0 |

TABLE 10

| Target brightness | AV1(1) | AV2(1) | AV3(1) | AV4(1) | AV5(1) |
|---|---|---|---|---|---|
| Target control amount | 1 | 2 | 3 | 4 | 5 |
| Corrected target control amount | 1c | 2c | 3c | 4c | 5c |

FIG. 8A shows a relationship between the corrected control amounts for the first light amount adjusting device 202 and the brightnesses at the corresponding actual stop positions, and a relationship between the corrected control amounts for the second light amount adjusting device 302 and the brightnesses at the corresponding actual stop positions.

As shown in FIG. 8A, it can be seen that the multiocular optical system unit according to the present embodiment can reduce the difference between the brightnesses at the corresponding actual stop positions of the first light amount adjusting device 202 and the second light amount adjusting device 302.

Further, FIG. 8B shows a relationship between the corrected control amounts for the first light amount adjusting device 202 and the corresponding F-numbers, and a relationship between the corrected control amounts for the second light amount adjusting device 302 and the corresponding F-numbers.

As shown in FIG. 8B, it can be seen that each of the F-numbers of the first optical system 2 and the second optical system 3 falls within the allowable range of the error in the multiocular optical system unit according to the present embodiment.

The table determined as shown in Table 8 in the first optical system 2 is stored in the first storing unit 206.

Further, the first and second tables determined as shown in Tables 9 and 10 in the second optical system 3 are stored in the second storing unit 306.

When the image pickup apparatus 10 is used, the tables are read from the first storing unit 206 and the second storing unit 306 by the first lens controller 204 and the second lens controller 304.

Next, when the target brightness of the second optical system 3 is set based on an instruction from the camera controller 104, the second lens controller 304 determines whether the target brightness is included in the first table or the second table.

Then, the first lens controller 204 refers to the obtained table, and the second lens controller 304 refers to the determined table to determine the corrected target control amounts corresponding to the target brightness.

Then, the first lens controller 204 and the second lens controller 304 controls a drive of the first driving unit 203 and the second driving unit 303 based on the determined corrected target control amount, respectively.

Thereby, it is possible to set the aperture diameter in each of the first light amount adjusting device 202 and the second light amount adjusting device 302 with a high accuracy.

As described above, in the multiocular optical system unit according to the present embodiment, respective target control amounts for the second light amount adjusting device 302 are allocated to a plurality of correction regions to perform different controls in accordance with the control amounts included in respective correction regions.

Specifically, the target control amount 0 is allocated to a first correction region, the remaining target control amounts on the close side of the target control amount 0 are allocated to a second correction region, and the correction is performed for each target control amount included in the second correction region, whereas the correction is not performed for the target control amount 0 included in the first correction region.

In other words, the target control amount corresponding to the target brightness is set based on a table (information) selected from a plurality of tables (a plurality of pieces of information) each of which indicates a relationship between the target control amounts and the target brightnesses included in the different correction regions (control regions, aperture diameter regions).

Thereby, as shown in FIGS. 8A and 8B, it is possible to set a predetermined brightness with keeping the F-number within the allowable range of the error in each of the first optical system 2 and the second optical system 3.

That is, the changes in the brightness can coincide with each other with keeping each F-number within the allowable range of the error between the first optical system 2 and the second optical system 3.

Accordingly, in the multiocular optical system unit according to the present embodiment, it is possible to reduce the difference in the brightness between two images obtained via the first optical system 2 and the second optical system 3 with satisfying the specification of the F-number in the first optical system 2 and the second optical system 3.

That is, it is possible to provide a multiocular optical system capable of performing a control with a high light amount accuracy to reduce a light amount difference between images obtained by instructing the same brightness in each optical system with satisfying the specification of the F-number in each optical system according to the present embodiment.

In the multiocular optical system unit according to the present embodiment, the target control amount corresponding to the target brightness is set for the second light amount adjusting device 302 by referring to either the first table or the second table, but the present invention is not limited thereto.

That is, the target control amount corresponding to the target brightness may be set for the second light amount adjusting device 302 by always referring to a combined table formed by combining the first table and the second table with each other.

Fifth Embodiment

FIGS. 9A and 9B show a state in which the control amounts for the first light amount adjusting device 202 and the second light amount adjusting device 302 are corrected in the multiocular optical system unit according to a fifth embodiment of the present invention, respectively.

Since the multiocular optical system unit according to the present embodiment has the same structure as that of the multiocular optical system unit 20 according to the first embodiment, the same members are denoted by the same reference numerals, and the description thereof is omitted.

In the multiocular optical system unit according to the fourth embodiment, the target control amount 0 for the second light amount adjusting device 302 is allocated to a first correction region, and the remaining target control amounts on the close side of the target control amount 0 are allocated to a second correction region.

Then, each target control amount included in the second correction region is corrected with reference to the target control amount 0 and the corresponding target brightness AV0(1) in the first optical system 2.

Thereby, changes in the brightness can coincide with each other between the first optical system 2 and the second optical system 3 with respect to each control amount included in the second correction region.

On the other hand, when the target control amount 0 is set, a difference in the brightness remains between the target brightness AV0(1) in the first optical system 2 and the target brightness AV0(2) in the second optical system 3 since the correction is not performed for the target control amount 0 included in the first correction region.

At this time, for example, when the target control amount is changed from 0 to 1, the target brightness in the first optical system 2 changes from AV0(1) to AV1(1), whereas the target brightness in the second optical system 3 changes from AV0(2) to AV1(1).

Further, when the target control amount is changed from 1 to 2, the target brightness in each of the first optical system 2 and the second optical system 3 changes from AV1(1) to AV2(1).

That is, the difference between the change in the target brightness in the first optical system 2 and the change in the target brightness in the second optical system 3 is different between when the target control amount is changed from 0 to 1 and when the target control amount is changed from 1 to 2.

As a result, when the target control amount is changed from 0 to 1 with a large difference in the change in the target brightness, there is a possibility that the brightness flickers.

Therefore, in the multiocular optical system unit according to the present embodiment, each target control amount is corrected such that such difference in the change of the target brightness becomes smaller stepwise in accordance with the change of the target control amount as described below.

Specifically, in the multiocular optical system unit according to the present embodiment, it is assumed that the relationships between the control amounts and the brightnesses as shown in FIG. 6A are obtained in the first optical system 2 and the second optical system 3, similarly to the multiocular optical system unit according to the fourth embodiment.

Further, it is assumed that the relationships between the control amounts and the F-numbers as shown in FIG. 6B are obtained in the first optical system 2 and the second optical system 3, similarly to the multiocular optical system unit according to the fourth embodiment.

At this time, in the first optical system 2, the corrected target control amounts 1a to 5a corresponding to the target brightnesses AV1(1) to AV5(1) are determined as indicated by white circles in FIG. 9A by correcting the target control amounts in the same manner as in the fourth embodiment.

Next, in the second optical system 3, first, the target control amount 0 corresponding to the full-aperture diameter of the optical system is allocated to a first correction region (a first aperture diameter region).

Further, after a part of the target control amounts on the open side among the target control amounts on the close side of the target control amount 0 is allocated to a third correction region (a third aperture diameter region), the remaining target control amounts on the close side are allocated to a second correction region (a second aperture diameter region).

That is, the first correction region is defined by the target control amount 0 corresponding to the full-aperture diameter of the optical system, and the third correction region is defined by a part of the target control amounts on the open side among the target control amounts on the close side of the target control amount 0. Further, the second correction region is defined by the remaining target control amounts on the close side among the target control amounts on the close side of the target control amount 0.

Specifically, a difference between the target brightness AV0(1) in the first optical system 2 and the target brightness AV0(2) in the second optical system 3 at the target control amount 0 is represented by D(0).

Then, the difference in the target brightness is decreased by a unit difference $\Delta D$ from D(0) each time the target control amount is changed by 1 until the difference becomes equal to or less than a target difference E, namely until the difference becomes sufficiently inconspicuous, and the target control amounts are allocated to the third correction region.

More specifically, a case where the difference D(0) is 0.3 steps, the unit difference $\Delta D$ is 0.1 steps, and the target difference E is 0.1 steps is considered, for example.

At this time, with respect to the target control amount 1, the target control amount 1 for the second light amount adjusting device 302 is corrected such that a difference D(1) between the target brightness AV1(1) in the first optical system 2 and the target brightness AV1a(2) in the second optical system 3 becomes D(0)−$\Delta D$=0.2 steps.

Next, with respect to the target control amount 2, the target control amount 2 for the second light amount adjusting device 302 is corrected such that a difference D(2) between the target brightness AV2(1) in the first optical system 2 and the target brightness AV2a(2) in the second optical system 3 becomes D(1)−$\Delta D$=0.1 steps.

At this time, since the difference D(2) of the target brightness in the target control amount 2 is equal to or less than E=0.1 steps, the target control amounts 1 and 2 are allocated to the third correction region.

In other words, with respect to the target control amounts 1 and 2, the target brightness in the second optical system 3 is corrected based on the unit difference $\Delta D$ so as to gradually approach the target brightness in the first optical system 2.

A number obtained by subtracting the target difference E from the difference D(0) between the target brightness in the first optical system 2 and the target brightness in the second optical system 3 at the target control amount 0 and then dividing the result by the unit difference $\Delta D$, namely (0.3−0.1)/0.1=two target control amounts are allocated to the third correction region.

In this way, the corrected target control amounts 1e and 2e corresponding to the target brightnesses AV1a(2) and AV2a(2) are determined as indicated by white circles in FIG. 9B.

Further, the target control amounts 3 to 5 included in the second correction region are corrected so as to correspond to the target brightnesses AV3(1) to AV5(1) with reference to the target control amount 0 and the corresponding target brightness AV0(1) in the first optical system 2.

In other words, the target brightnesses at the target control amounts 3 to 5 are corrected by the difference between the target brightness AV0(1) at the target control amount 0 in the first optical system 2 and the target brightness AV0(2) at the target control amount 0 in the second optical system 3.

In this way, the corrected target control amounts 3e, 4e and 5e corresponding to the target brightnesses AV3(1), AV4(1) and AV5(1) are determined as indicated by white circles in FIG. 9B.

Note that the corrected target control amounts 3e, 4e and 5e determined herein are identical to the corrected target control amounts 3c, 4c and 5c determined in the fourth embodiment as shown in FIG. 7B, respectively.

Table 11 shows the target brightnesses, the corresponding target control amounts and the corresponding corrected target control amounts in the first optical system 2.

TABLE 11

| Target brightness | AV0(1) | AV1(1) | AV2(1) | AV3(1) | AV4(1) | AV5(1) |
|---|---|---|---|---|---|---|
| Target control amount | 0 | 1 | 2 | 3 | 4 | 5 |
| Corrected target control amount | 0 | 1a | 2a | 3a | 4a | 5a |

Table 12 shows the target brightness, the corresponding target control amount and the corresponding corrected target control amount in the first correction region in the second optical system 3 as a first table.

Further, Table 13 shows the target brightnesses, the corresponding target control amounts and the corresponding corrected target control amounts in the third correction region in the second optical system 3 as a third table.

Furthermore, Table 14 shows the target brightnesses, the corresponding target control amounts and the corresponding corrected target control amounts in the second correction region in the second optical system 3 as a second table.

TABLE 12

| Target brightness | AV0(2) |
|---|---|
| Target control amount | 0 |
| Corrected target control amount | 0 |

TABLE 13

| Target brightness | AV1a(2) | AV2a(2) |
|---|---|---|
| Target control amount | 1 | 2 |
| Corrected target control amount | 1e | 2e |

TABLE 14

| Target brightness | AV3(1) | AV4(1) | AV5(1) |
|---|---|---|---|
| Target control amount | 3 | 4 | 5 |
| Corrected target control amount | 3e | 4e | 5e |

FIG. 10A shows a relationship between the corrected control amounts for the first light amount adjusting device 202 and the brightnesses at the corresponding actual stop positions, and a relationship between the corrected control amounts for the second light amount adjusting device 302 and the brightnesses at the corresponding actual stop positions.

As shown in FIG. 10A, it can be seen that the multiocular optical system unit according to the present embodiment can reduce the difference between the brightnesses at the corresponding actual stop positions of the first light amount adjusting device 202 and the second light amount adjusting device 302.

Further, FIG. 10B shows a relationship between the corrected control amounts for the first light amount adjusting device 202 and the corresponding F-numbers, and a relationship between the corrected control amounts for the second light amount adjusting device 302 and the corresponding F-numbers.

As shown in FIG. 10B, it can be seen that each of the F-numbers of the first optical system 2 and the second optical system 3 falls within the allowable range of the error in the multiocular optical system unit according to the present embodiment.

The table determined as shown in Table 11 in the first optical system 2 is stored in the first storing unit 206.

Further, the first, second and third tables determined as shown in Tables 12, 13 and 14 in the second optical system 3 are stored in the second storing unit 306.

When the image pickup apparatus 10 is used, the tables are read from the first storing unit 206 and the second storing unit 306 by the first lens controller 204 and the second lens controller 304.

Next, when the target brightness of the second optical system 3 is set based on an instruction from the camera controller 104, the second lens controller 304 determines whether the target brightness is included in the first table, the second table or the third table.

Then, the first lens controller 204 refers to the obtained table, and the second lens controller 304 refers to the determined table to determine the corrected target control amounts corresponding to the target brightness.

Then, the first lens controller 204 and the second lens controller 304 controls a drive of the first driving unit 203 and the second driving unit 303 based on the determined corrected target control amount, respectively.

Thereby, it is possible to set the aperture diameter in each of the first light amount adjusting device 202 and the second light amount adjusting device 302 with a high accuracy.

As described above, in the multiocular optical system unit according to the present embodiment, respective target control amounts for the second light amount adjusting device 302 are allocated to a plurality of correction regions to perform different controls in accordance with the control amounts included in respective correction regions.

Specifically, the target control amount 0 is allocated to the first correction region, the target control amounts corrected such that the difference between the target brightness in the first optical system 2 and the target brightness in the second optical system 3 is gradually reduced are allocated to the third correction region, and the remaining target control amounts are allocated to the second correction region.

Then, the above-described corrections are performed for the target control amounts included in the third correction region and the second correction region, whereas no correction is performed for the target control amount 0 included in the first correction region.

In other words, the target control amount corresponding to the target brightness is set based on a table selected from a plurality of tables each of which indicates the relationship between the target control amounts and the target brightnesses included in different correction regions.

In the multiocular optical system unit according to the present embodiment, it is possible to set a predetermined brightness while keeping the F-number within the allowable range of the error in the first optical system 2 and the second optical system 3 by performing the above-described controls as shown in FIGS. 10A and 10B.

That is, the change in the brightness can gradually coincide with each other as the target control amount changes with keeping each F-number within the allowable range of the error in the first optical system 2 and the second optical system 3.

Thereby, it is possible to reduce an uncomfortable feeling when two images obtained via the first optical system 2 and the second optical system 3 are simultaneously viewed, and also to reduce a flickering when the brightness changes.

Accordingly, in the multiocular optical system unit according to the present embodiment, it is possible to reduce the difference in the brightness between the two images obtained via the first optical system 2 and the second optical system 3 with satisfying the specification of the F-number in the first optical system 2 and the second optical system 3.

It is possible to provide a multiocular optical system capable of performing a control with a high light amount accuracy to reduce a light amount difference between images obtained via each optical system with satisfying the specification of the F-number in each optical system and reducing a flickering when the brightness changes according to the present embodiment.

In the multiocular optical system unit according to the present embodiment, the target control amount corresponding to the target brightness is set for the second light amount adjusting device 302 by referring to any one of the first table, the second table and the third table, but the present invention is not limited thereto.

That is, the target control amount corresponding to the target brightness may be set for the second light amount adjusting device 302 by always referring to a combined table formed by combining the first table, the second table and the third table with each other.

According to the present invention, it is possible to provide an optical apparatus capable of adjusting a light amount in each of a plurality of optical systems with a simple structure.

Although preferred embodiments have been described above, the present invention is not limited to these embodiments, and various modifications and changes can be made without departing from the scope of the present invention.

Further, the present embodiment also includes a method having various steps for making the above-described tables.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205722, filed Dec. 20, 2021, and Japanese Patent Application No. 2021-205741, filed Dec. 20, 2021, which are hereby incorporated by reference herein in their entirety.

What is claimed is:

1. An optical apparatus comprising:
a plurality of optical systems each of which includes a stop;
a storing unit configured to store information indicating a relationship between target aperture diameters of the stop and target light amounts in the respective optical systems; and a controller configured to adjust a light amount by changing an aperture diameter of the stop in the respective optical systems based on the information,
wherein the information includes information regarding the target aperture diameters corresponding to the target light amounts, respectively, determined based on a relationship between a plurality of values between a minimum value and a maximum value of the aperture diameter, and a plurality of measurement values of the light amount corresponding to the plurality of values, respectively, in each of the plurality of optical systems, and
wherein the plurality of values includes a first value between the minimum value and the maximum value, a second value between the minimum value and the first value, and a third value between the first value and the maximum value.

2. An image pickup apparatus comprising:
the optical apparatus according to claim 1; and
an image pickup element configured to receive light of an image formed by the optical apparatus.

3. The optical apparatus according to claim 1,
wherein the target light amount is corrected based on a difference between a first light amount when the stop has a predetermined aperture diameter in a first optical system of the plurality of optical systems, and a second light amount when the stop has the predetermined aperture diameter in a second optical system different from the first optical system of the plurality of optical systems when the target aperture diameter corresponding to the target light amount is determined in the respective optical systems.

4. The optical apparatus according to claim 3,
wherein the first light amount is a light amount when the aperture diameter has the maximum value.

5. The optical apparatus according to claim 3,
wherein the second optical system is an optical system in which the light amount when the aperture diameter has the maximum value is smallest among the plurality of optical systems.

6. A method of controlling an optical apparatus by forming information indicating a relationship between target aperture diameters of a stop and target light amounts in each of a plurality of optical systems, each of which includes the stop, the method comprising:
a measuring step of measuring light amounts corresponding to a plurality of values between a minimum value and a maximum value of an aperture diameter of the stop, respectively, in each of the plurality of optical systems; and
a determining step of determining the target aperture diameters of the stop corresponding to the target light amounts, respectively, based on a measurement result in the measuring step, in each of the plurality of optical systems,
wherein the plurality of values includes a first value between the minimum value and the maximum value, a second value between the minimum value and the first value, and a third value between the first value and the maximum value.

7. The method according to claim 6,
wherein the determining step includes a step of correcting the target light amount based on a difference between a first light amount when the stop has a predetermined aperture diameter in a first optical system of the plurality of optical systems, and a second light amount when the stop has the predetermined aperture diameter in a second optical system different from the first optical system of the plurality of optical systems.

8. The method according to claim 7, wherein the first light amount is a light amount when the aperture diameter has the maximum value.

9. The method according to claim 7, wherein the second optical system is an optical system in which the light amount when the aperture diameter has the maximum value is smallest among the plurality of optical systems.

\* \* \* \* \*